July 29, 1941.   G. DOBKE   2,250,986
VACUUM-TIGHT METAL-TO-CERAMIC SEAL AND METHOD OF MAKING SAME
Filed Sept. 5, 1940
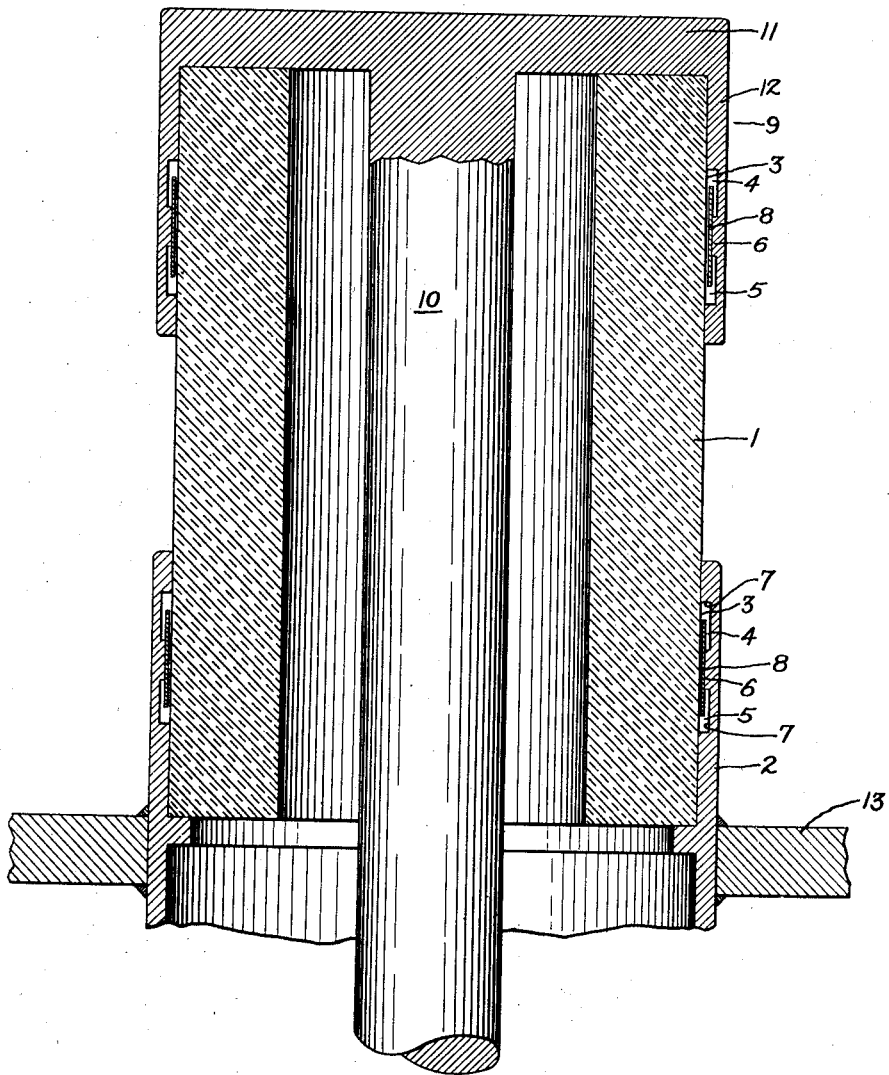
Inventor:
Günther Dobke,
by Harry E. Dunham
His Attorney.

Patented July 29, 1941

2,250,986

UNITED STATES PATENT OFFICE 2,250,986

VACUUM-TIGHT METAL-TO-CERAMIC SEAL AND METHOD OF MAKING SAME

Günther Dobke, Berlin-Wilmersdorf, Germany, assignor to General Electric Company, a corporation of New York Application September 5, 1940, Serial No. 355,475
In Germany November 26, 1938

4 Claims. (Cl. 113—112)

This invention relates to metal-to-ceramic seals and to a process of preparing the same.

One object of the invention is to provide a metal-to-ceramic seal which is pressure- and vacuum-tight over a wide range of temperatures.

A further object of the invention is to provide a simple method of joining metal and ceramic parts without the prior application of metallized layers or coatings to the ceramic body.

The preparation of vacuum-tight connections between metal and ceramic substances is attended by numerous difficulties primarily because those soldering materials which adhere especially well to metal, adhere to ceramic materials only with relatively great difficulty. Two general processes involving the use of hard solders, such as silver solder, have previously been used for the production of vacuum-tight soldered connections between ceramic and metal parts. In one process, the ceramic substance is metallized before the soldering operation either by application to the ceramic material of a platinum layer chemically applied thereto or by application of a layer of heavy metal such as tungsten, iron or similar metals chemically, electrolytically or otherwise applied to the surface and caused to adhere thereto by suitable sintering operations. In accordance with the second process, the soldering is effected preferably in a vacuum by means of a silver solder modified by the addition of certain substances capable of reacting with the ceramic substance.

In accordance with my invention, vacuum-tight soldered connections between parts consisting of ceramic material and metal, such as vacuum-tight current inlets, are obtained by the application to the surface of the ceramic material of a metal oxide capable of chemically reacting with the ceramic material and later with the solder to form an intermediate layer firmly adhering both to the solder and the ceramic body. The oxides added for this purpose are particularly the oxides of the metals of the iron group which, when applied to a ceramic body containing a considerable amount of magnesium silicate, will react with the magnesium silicate to form, for example, in the case of iron oxide, an iron-magnesium-silicate probably through the partial replacement of the magnesium in the crystal grid of the ceramic body by the iron. The layer so formed has the property of closely adhering to the silver solder used in sealing the parts together particularly if the silver is brought into sufficiently close contact with the ceramic material by carrying out the soldering operation in a vacuum.

As no glazed or metallic intermediate layer is formed, it would seem that in all probability some reaction must take place between the iron-magnesium-silicate layer and the silver atoms of the solder to produce the ultimate bond. Possibly, the iron atoms on the surface of the ceramic part are readily interchangeable with the silver atoms so that a close connection between the silver solder and the ceramic body is obtained by such interchange.

The iron-magnesium-silicate layer can be easily produced, for instance, by the application of a coating of iron hydroxide to the surface of the ceramic material, such as a steatite body, followed by a heat treatment at the decomposition temperature of the hydroxide. At this temperature the oxide becomes burned into or reacted with the surface layer of the ceramic material. Although other oxides of the iron group may be used, iron hydroxide is particularly useful in that it may easily be obtained in colloidal form thus facilitating application to the ceramic surface. Further, the iron hydroxide readily decomposes to the oxide at firing temperatures of about 1000° to 1200° C. at which temperature the oxide fuses into the ceramic substance.

The oxide or hydroxide of the metal of the iron group may be applied to the surface of the fully fired ceramic body or, if desired, to the surface of a partly fired ceramic part. In certain instances, the requisite amount of iron oxide may be added to the initial materials from which the ceramic part is formed.

The process of preparing my metal-to-ceramic seal will be more readily understood by reference to the accompanying drawing showing a current inlet comprising an insulating portion in the form of a tubular ceramic body 1 inserted in soldering position within a close fitting metal supporting tube 2 of iron, steel, or the like. That portion of the ceramic surface designated by numeral 3 actually to be involved in the soldering operation has been treated with an iron hydroxide solution and fired to obtain a thin surface layer probably comprising iron-magnesium-silicate. The interior surface of the metal part 2 is provided with two annular grooves 4 and 5 with an inwardly projecting raised portion 6 between grooves 4 and 5 to which the actual soldering of the ceramic part is to take place. Raised portion 5 is of such height with respect to the remaining surface of the tube as to leave a small clearance between the ceramic tube and the surface of the raised portion when the ceramic part is inserted into the steel tube 2. Preferably, the surfaces of grooves 4 and 5 have been provided with thin baked surface coatings 7 of a mixture comprising polystyrene and talcum. Because the surface tension of silver is much greater than its tension towards this coating the silver tends to form a small band between the surface of the ceramic part and the uncoated inwardly projecting portion of the steel tube. After thoroughly cleaning the surface of the inwardly projecting portion 6, a thin band 8 of silver solder, preferably pure silver, is inserted into the annular recess in metal tube 2 formed by grooves 4 and 5 and the slightly raised portion 6 and the ceramic part and metal tube are assembled as shown in the drawing.

To complete the current inlet device, a second metal part 9 is mounted on the upper end of the tubular ceramic body. This metal part comprises a conductor in the form of a rod 10 connected to a cap 11 having a depending tubular portion 12 which is adapted to fit over the ceramic body in the same manner as metal tube 2. The detailed construction of depending tubular portion 12 is the same as that of tube 2 and similar reference numerals have been used to indicate corresponding elements or parts.

To obtain the final sealing or soldering of the assembled parts, the assembly is heated to a temperature of 1000° to 1200° C., preferably between 1100° and 1150° C., in a vacuum when pure silver is used as a soldering material. This heating operation ordinarily requires about three hours. By maintaining the seal under vacuum during the entire heat treatment, any air present in the melted silver is removed therefrom, permitting intimate contact between the silver solder and the ceramic body on the one hand and the metal body on the other. If desired, the seal may be cooled under pressure in an inert atmosphere, such at nitrogen, so that any air holes or bubbles not removed during the vacuum treatment will be decreased by the pressure treatment to an insignificant size. When the completed current inlet device is soldered or otherwise attached to container 13, electrical connection with apparatus contained therein is made through rod 10.

Seals prepared in accordance with my invention are capable of withstanding repeated subjection to temperatures as high as 600° C. and pressure of six atmospheres and may be used wherever tight, strong seals between metal and ceramic bodies are required such as in capacitor bushings, or in current inlets, etc. in electrical apparatus.

What I claim as new and desire to secure by Letters Patent of the United States is:

1. The process of making an electrical insulator by joining a metal body and a steatite ceramic body which comprises coating the surface of said steatite body with iron hydroxide, firing said coated body at a temperature of 1000° C. to 1200° C. to decompose said hydroxide to an oxide and to fuse said oxide into the surface of said steatite body, and silver soldering said metal body to the iron oxide coated surface of said ceramic body.

2. In combination, a ferrous metal body silver soldered to a steatite body, said steatite body being provided with a fused iron-magnesium-silicate surface layer which in conjunction with the silver solder forms a vacuum-tight seal between said metal body and said steatite body.

3. In combination, a steatite body having a fused surface layer of iron-magnesium-silicate, and a metal body joined thereto by means of a silver solder.

4. In combination, a steatite ceramic body having a surface layer which contains a fused mixture of iron oxide and magnesium silicate, and a metal body integrally joined to said surface layer by means of a silver solder.

GÜNTHER DOBKE.